United States Patent [19]

Kurz et al.

[11] 4,379,989

[45] Apr. 12, 1983

[54] SYSTEM FOR PREVENTING DAMAGE TO A BATTERY CHARGER DUE TO APPLICATION OF A BATTERY WITH WRONG POLARITY

[75] Inventors: Wolfgang Kurz, Hemmingen; Rainer Leunig, Gerlingen, both of Fed. Rep. of Germany

[73] Assignee: Robert Bosch GmbH, Stuttgart, Fed. Rep. of Germany

[21] Appl. No.: 147,300

[22] Filed: May 6, 1980

[30] Foreign Application Priority Data

May 11, 1979 [DE] Fed. Rep. of Germany ....... 2919021
May 11, 1979 [DE] Fed. Rep. of Germany ....... 2919022

[51] Int. Cl.³ .............................................. H02J 7/00
[52] U.S. Cl. ...................................... 320/26; 361/246
[58] Field of Search .................... 320/25, 26; 361/245, 361/246, 82, 89; 307/10.13 D

[56] References Cited

U.S. PATENT DOCUMENTS 3,307,097 2/1967 Brewster ............................... 320/25
3,313,995 4/1967 Bach et al. ........................... 320/25
3,659,183 4/1972 Carlson ................................. 320/25

Primary Examiner—R. J. Hickey
Attorney, Agent, or Firm—Frishauf, Holtz, Goodman & Woodward

[57] ABSTRACT

The electrical system of a motor vehicle is protected against damage due to voltage sources, either the own battery or an external source, connected with wrong polarity by the combination of a diode and relay switches. In one embodiment, the diode is connected to the battery so that current flows only when the battery is connected with the correct polarity. The relay coil connected in series with the diode controls contacts which connect the battery to the rest of the circuit only when current flows through the diode. Alternatively, or in conjunction with this type of circuit, a shunting diode can be provided through which current flows only when the battery is connected with incorrect polarity. When current flows through this shunting diode, it also flows through the contacts of excess current cutout which then open to disconnect the battery from the remainder of the circuit.

12 Claims, 10 Drawing Figures

FIG. 10  Types of Protection for the Described Embodiments

| Figure | Alternator at rest; may start later — Battery is, or will be mounted — Battery charged, but wrong polarity | Battery discharged; right polarity; external source of wrong polarity applied | Battery missing external source connected with wrong polarity | Alternator running — Battery removed and re-installed with wrong polarity | Ext. source - wrong polarity — Battery missing | Ext. source - wrong polarity — Battery present with correct polarity |
|---|---|---|---|---|---|---|
| 1 | + | − | + | − | − | − |
| 2 | o | o | o | o | o | o |
| 3 | + | o | + | o | o | o |
| 4 | + | + | + | + | + | − |
| 5 | + | + | + | + | + | − |
| 6 | + | + | + | + | + | o |
| 7 | + | + | + | + | + | − |
| 8 | + | + | + | + | + | + |
| 9 | + | + | + | + | + | − |

+ = complete protection
o = limited protection due to limited life of excess current cutout
− = no protection

SYSTEM FOR PREVENTING DAMAGE TO A BATTERY CHARGER DUE TO APPLICATION OF A BATTERY WITH WRONG POLARITY

The present invention relates to apparatus for protecting a battery charging system from damage due to application of the battery with incorrect polarity. In particular it relates to protective apparatus for the electrical system in a motor vehicle. In such a system, if the battery is connected with incorrect polarity to the alternator, a short circuit current flows through the rectifier bridge of the alternator and destroys it.

BACKGROUND AND PRIOR ART

Apparatus for preventing damage due to the above-mentioned short circuit current utilizes, in the known systems, a rapidly acting switch which reacts to the above-mentioned short circuit current and disconnects the battery. This disconnection must be achieved very rapidly so that the product of the short circuit current and the time during which this current flows remains within acceptable bounds. Generally bimetal switches are used for this purpose. These very seldom achieve the required switching speed. Further, for this type of switch, the danger exists that after a number of incorrect battery connections the contacts become welded together so that no more protection exists. The same problems are encountered when an external voltage source such as a starter battery is connected to the circuit.

THE INVENTION

It is an object of the present invention to furnish a protection system which either does not allow the battery or other voltage source to be connected to the circuit at all if the polarity is wrong or, alternatively, allows it to be disconnected so rapidly that the amount of current flowing through the rectifier bridge is sufficiently small as to be disregarded. In accordance with the present invention, the absence or presence of current flow through a unidirectional conducting element (diode) is indicative of whether or not the battery is connected with the correct polarity. A switch operative in accordance with the absence or presence of current flow through the unidirectional conducting element disconnects the battery from the circuit in the event that the polarity is incorrect. Specifically, in a first embodiment, current flows through the diode if the battery is connected with the correct polarity. The current through the diode flows also through a relay coil. The contacts of the relay coil close to connect the battery to the remainder of the circuit. In a second embodiment, current flows through the diode when the battery is incorrectly connected. This current flow causes an excess current cutout connected in series with the battery to open. In the last-mentioned embodiment, the current if the battery is incorrectly connected is taken up by the unidirectional conducting element and, in the main, does not pass through the rectifier circuit at all.

In an alternate embodiment, a switch has a movable contact member which closes its main contacts only when the battery is present, that is the weight of the battery causes a closing of the switch.

Numerous other embodiments allow an optimum matching of the desired protection and the required equipment and/or cost.

DRAWING DESCRIBING PREFERRED EMBODIMENTS

FIG. 10 is a table summarizing the types of protection to be obtained.

The present invention will be described in connection with the electrical supply circuits in a motor vehicle. It can, of course, be utilized for other applications, namely any applications in which an alternator, a load and a battery are included.

For battery charging systems in motor vehicles, the following instances of incorrect operation can occur:

a. The engine is not running and the battery is inserted with incorrect polarity.

b. The engine is not running and a discharged battery is within the system. An external voltage source is connected with incorrect polarity.

c. The engine is not running. No battery is present in the vehicle. An external voltage source with incorrect polarity is connected to the system.

d. The vehicle is standing still with a running engine. The battery is taken out, put back in and is connected with incorrect polarity.

e. The engine of the vehicle is running, but no battery is present. An external voltage source is connected with incorrect polarity.

f. The vehicle is standing still with engine running, the battery is present and has the correct polarity. An external voltage source is connected with incorrect polarity.

The different embodiments of the present invention are designed to prevent damage to the alternator and the load due to incorrect polarity of either the battery or the external voltage source under the above conditions.

Figure 1:
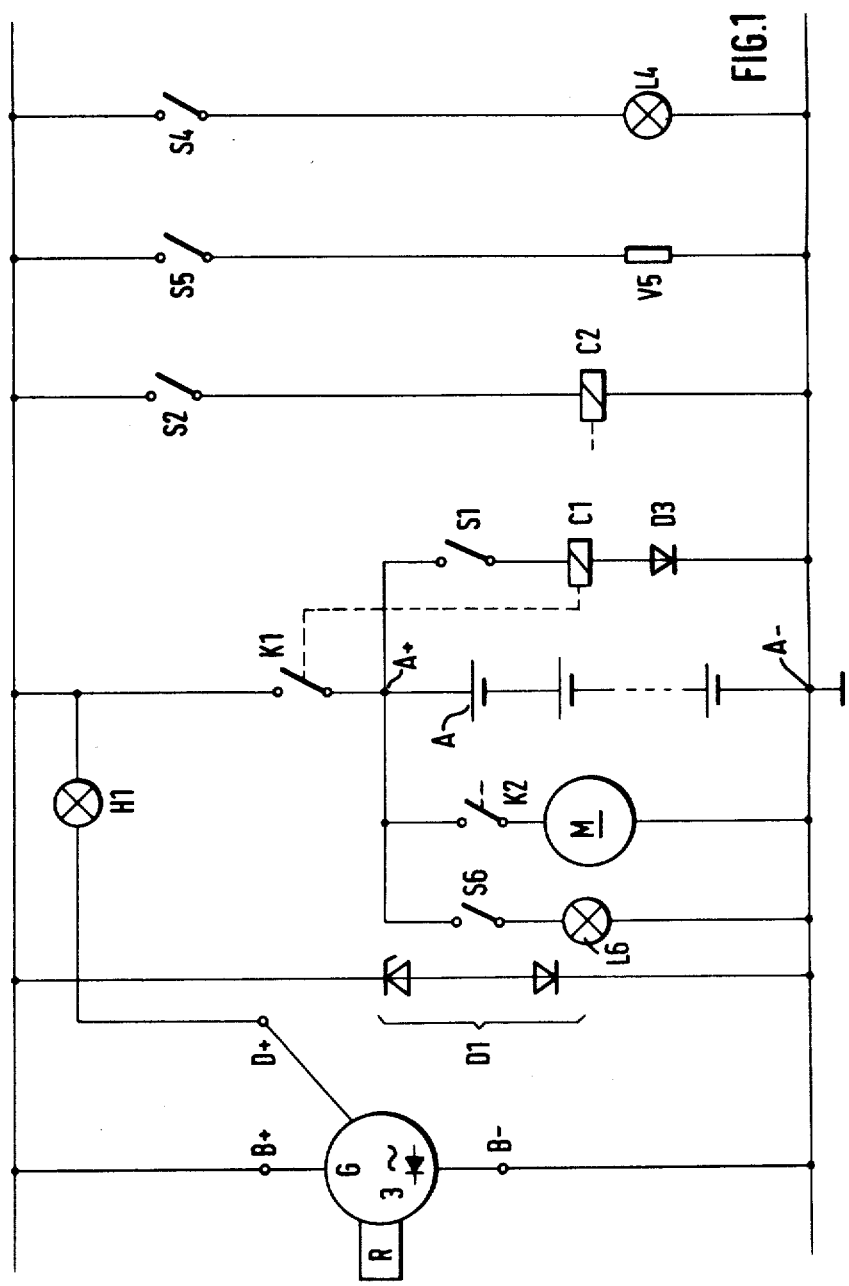
FIG. 1 is a circuit diagram of a system in which the battery is not connected to at least part of the alternator circuit if the polarity is incorrect.

A first embodiment of the present invention is shown in FIG. 1. It includes an alternator G having a rectifier connected thereto, as well as a voltage regulator R. Alternator G has a positive terminal B+ and a negative terminal B− as well as a terminal D+ which is connected to the positive side of the exciter diodes. Output terminals B+ and B− of alternator G are connected to a series circuit D1 which includes a Zener diode in the blocked state and a diode in the conductive state. This series circuit D1 is an over-voltage protection in the case the system is operated without a battery. A charge control lamp H1 is connected between terminal B+ and D+. The system further contains a battery A whose negative terminal A— is connected to terminal B— of the alternator and, in general, also to the chassis of the vehicle. A number of loads L6, such as parking lights, is connected in parallel to the battery. These can be turned on by operation of a switch S6. Further, a starter motor M is connected in parallel to the battery. This can be put into operation by closing of contact K2. A relay C2 which operates the normally open contact K2 can be energized by closing of a switch S2. S2 is the starter switch. Further, an additional number of loads V5 can be connected from terminal B+ to terminal B— by closing of a switch S5. Loads V5 are subject to damage if the wrong polarity of voltage is applied thereto. Loads L4 which are not sensitive to the polarity of the applied voltage, for example windshield wipers, rear window defrosters, etc. can be energized by closing of a switch S4.

Before the vehicle is to be started, the main switch S1 must be closed. If battery A is connected with the correct polarity, current flows through switch S1 and a series circuit including a protective relay C1 and a protective diode D3. Relay C1 operates contacts K1. When contacts K1 close, the terminal A+ of the battery A is connected to terminal B+ of the rest of the electrical system. If the battery A is connected with wrong polarity, no current can flow through relay coil C1 when switch S1 is closed. Contacts K1 remain open. Therefore even closing of switch S2 does not cause the starter relay C2 to become activated. It is an advantage of this embodiment that a short circuit current cannot occur in the first place. It is a further advantage that lights L6 may be lit even if the polarity of battery A is incorrect.

Figure 2:
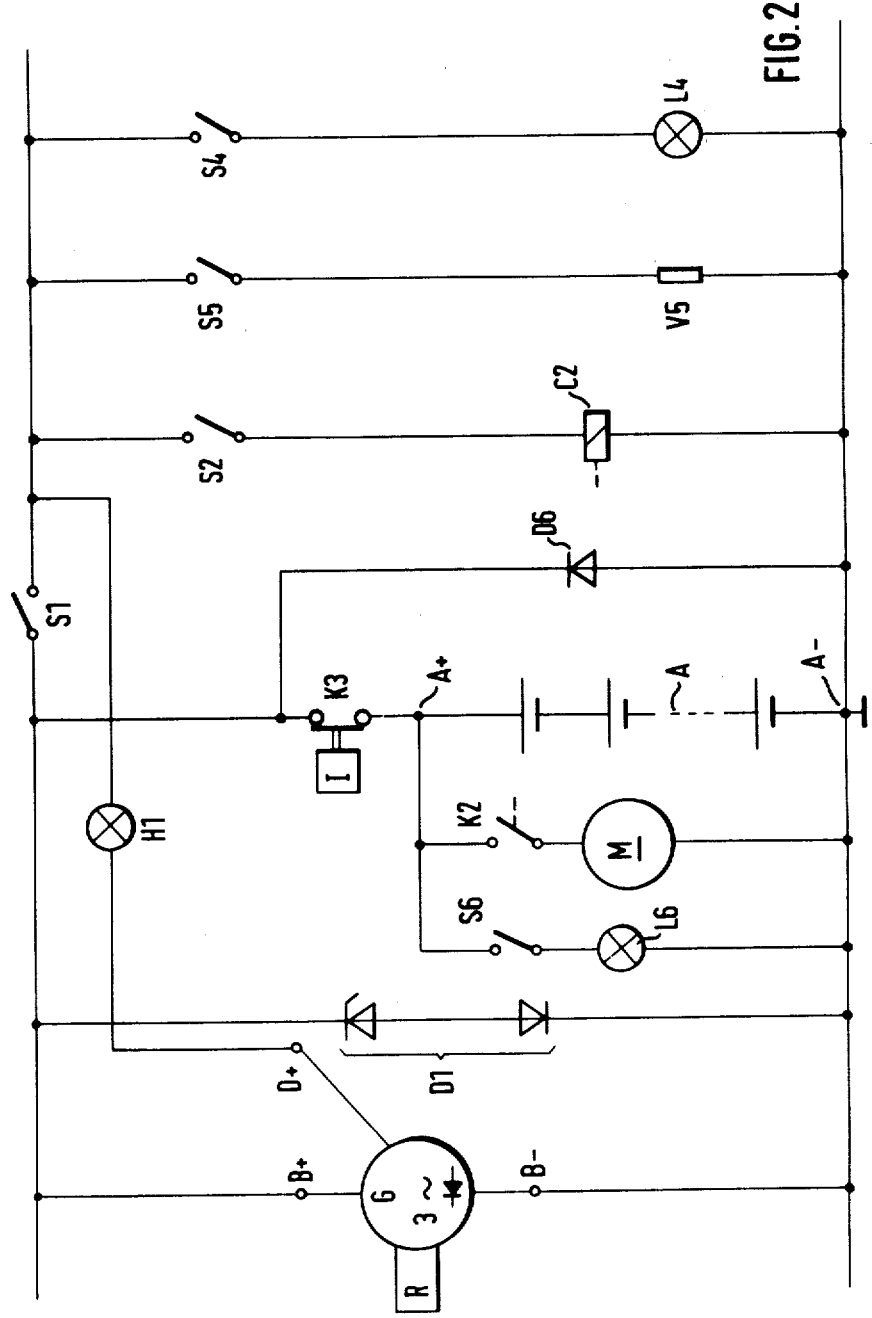
FIG. 2 shows a protective system having a shunting diode and excess current cutout.

In the embodiment shown in FIG. 2, the main switch S1 is connected as is usually the case, between terminal B+ of the alternator on the one hand and the loads V5, L4 and the starter circuit S2, C2 on the other hand. An excess current cutout I is connected between terminal A+ of battery A and terminal B+ of alternator G. Specifically, the contacts K3 of the excess current cutout I open up when more than a predetermined current flows through the contacts. Further, a shunting diode D6 which absorbs most of the load current is connected from terminal A— to terminal B+. It should be noted that the anode of diode D6 is connected to terminal B—, while its cathode is connected to terminal B+.

In this embodiment, the protection circuit reacts immediately that battery A is connected with incorrect polarity. Short circuit current flows instantly through shunting diode D6 and the excess current cutout I immediately disconnects battery A from the rest of the circuit. Shunting diode D6 takes over the short circuit current because the full battery voltage is applied to it, while each diode in the rectifier of the alternator has only one-half the battery voltage applied to it.

Figure 3:
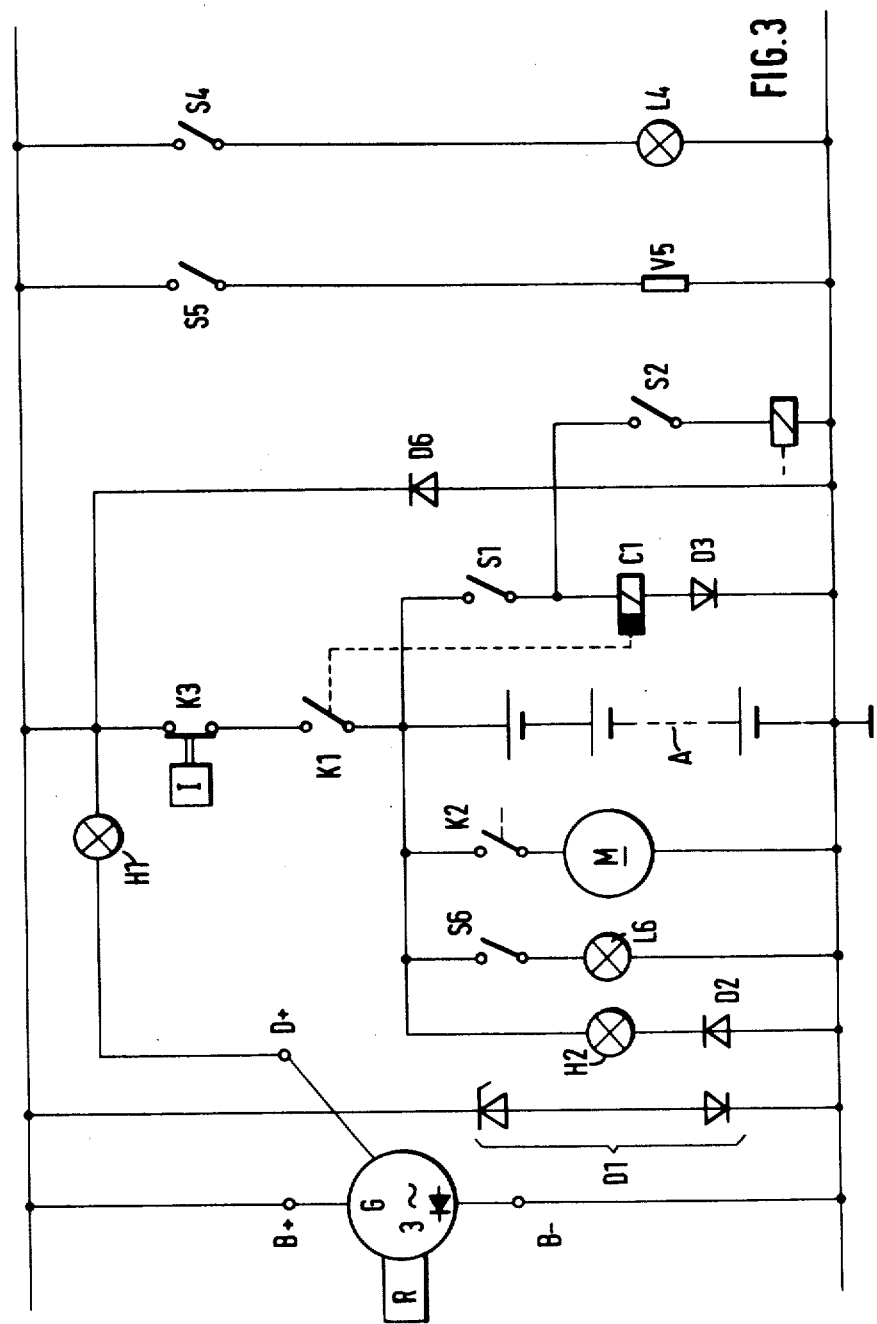
FIG. 3 shows a protective system combining the embodiments shown in FIGS. 1 and 2.

The embodiment shown in FIG. 3 combines the embodiments shown in FIGS. 1 and 2. The main switch S1 is again connected in series with the protective relay coil C1 and the protective diode D3. The so-formed series circuit is connected in parallel with battery A. Again, contacts K1 are controlled by relay coil C1. The contacts K3 of excess current cutout I are connected in series with contacts K1. The series circuit including starter switch S2 and the starter relay coil C2 is connected in parallel with the series circuit including relay coil C1 and diode D3.

This third embodiment is particularly advantageous when battery A is first removed while the engine is running and then is put in again. Since alternator G is running, coil C1 is energized and contacts K1 are closed. Relay coil C1 has a predetermined dropout time. If the terminals of battery A are clamped on with wrong polarity, contacts K1 will, throughout the dropout time, remain closed. Excess current cutout I will respond due to current flow through diode D6 and contacts K3 will open. The additional advantage of the embodiment of FIG. 3 is that, if the engine is not running and the battery is connected with incorrect polarity, a short circuit current cannot flow in the first place because relay coil C1 is not energized, but if the engine is running and the battery is connected incorrectly, the short circuit current is absorbed by diode D6 and causes the excess current cutout to open. The last-mentioned action protects contacts K1.

Figure 4:
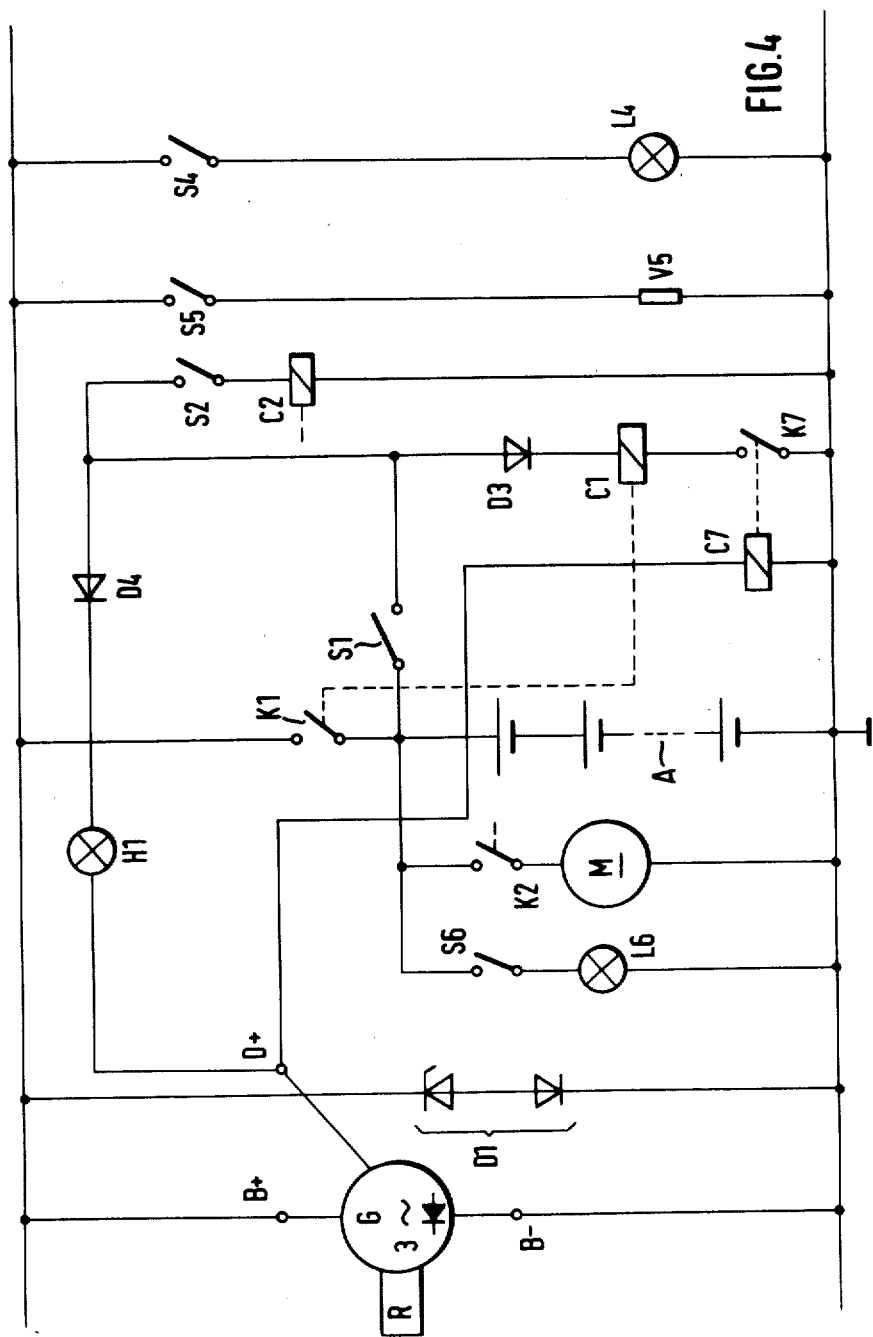
FIG. 4 is a circuit diagram of a modification of the embodiment shown in FIG. 1, but using an auxiliary relay.

The embodiment shown in FIG. 4 corresponds in the main to that shown in FIG. 1. However, an auxiliary relay C7 is provided which controls auxiliary contacts K7. The coil C7 of the auxiliary relay is connected between terminal D+ of the exciter diodes of alternator G and the terminal B—. The contacts K7 are connected in series with the coil C1 of the protective relay, as well as with main switch S1 and diode D3. However, in FIG. 4 starter switch S2 and coil C2 of the starter relay are connected in parallel with the series circuit of diode D3, relay coil C1 and contact pair K7.

In this embodiment, the engine can be started by starter motor N upon activation of the main switch S1 and closing of starter switch S2. If the battery is connected with the correct polarity to the battery terminals, a positive potential is applied through lamp H1 and a protective diode D4 to terminal D+ of the exciter diodes. An exciting current flows and alternator G is excited. Auxiliary relay C7, which allows battery A to be connected only if the engine is running has, meanwhile, closed auxiliary contacts K7. Current now flows through relay coil C1 and contacts K1 close. The battery is connected to the positive terminal B+ if it has the right polarity. If the battery has been clamped on with the wrong polarity, the engine may be started via switch S2, coil C2, contacts K2 and starter motor M, but relay C1 cannot close contacts K1 because no current flows through coil C1. Alternator G is therefore not connected to the battery A if the battery has been clamped in with the wrong polarity.

Figure 5:
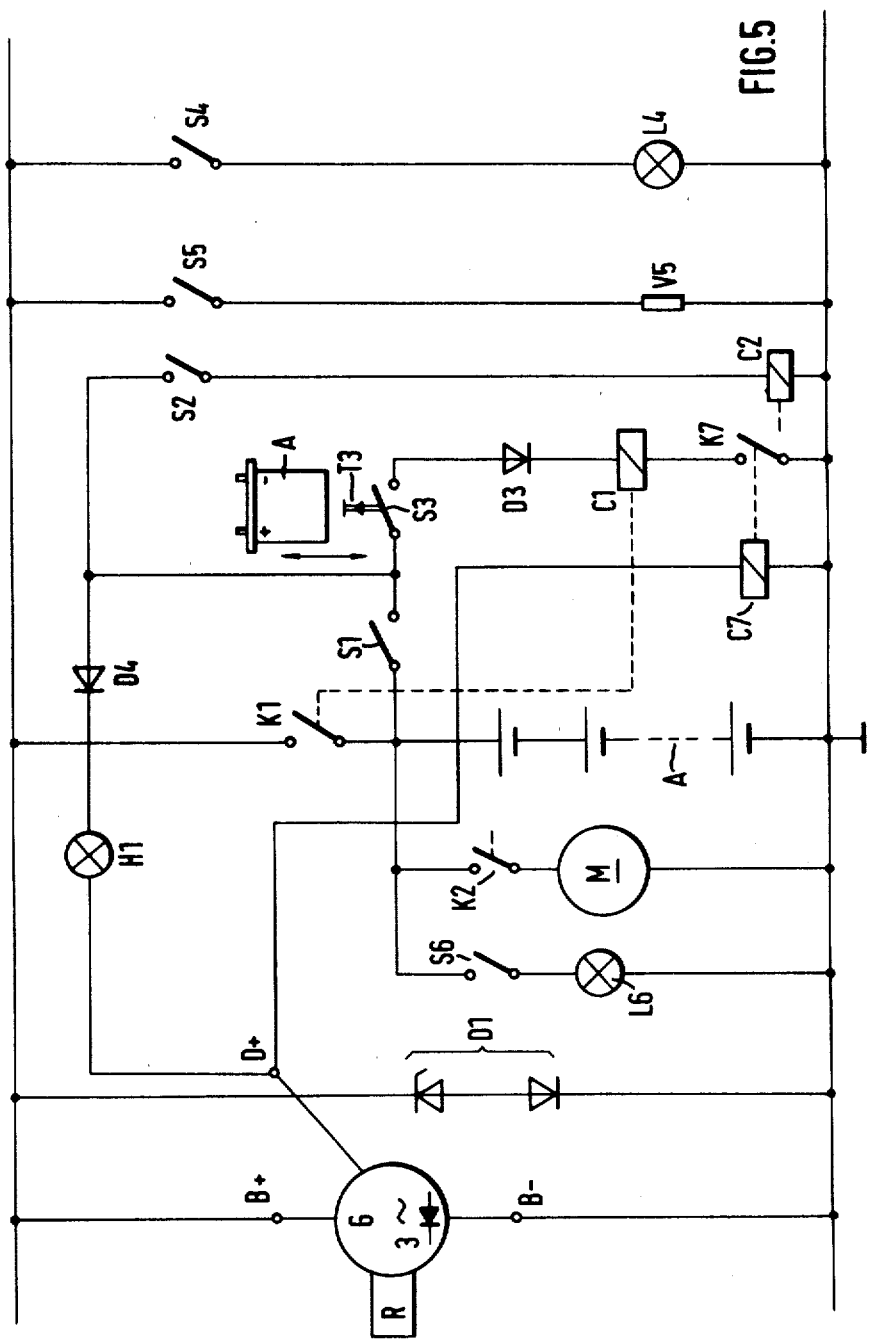
FIG. 5 is a variation of the embodiment shown in FIG. 1.

The difference between the embodiment shown in FIG. 5 from that shown in FIG. 4 is mainly that a switch S3/T3 is provided in the embodiment shown in FIG. 5. Specifically, contacts S3 of the switch are connected in series with diode D3. A movable contact arm T3 is so arranged that it closes contacts S3 only if battery A is in its mounting. The remainder of the circuit in FIG. 5 is the same as that shown in FIG. 4. If no battery is present, contacts K1 need not be closed. When battery A is removed from its mounting while alternator G is running, then relay C1 is deenergized and contacts K1 open. If, while the engine and the alternator are running a battery A is reinserted, but with wrong polarity, relay C1 is not energized, contacts K1 remain open and battery A is not connected to the rest of the system.

Figure 6:
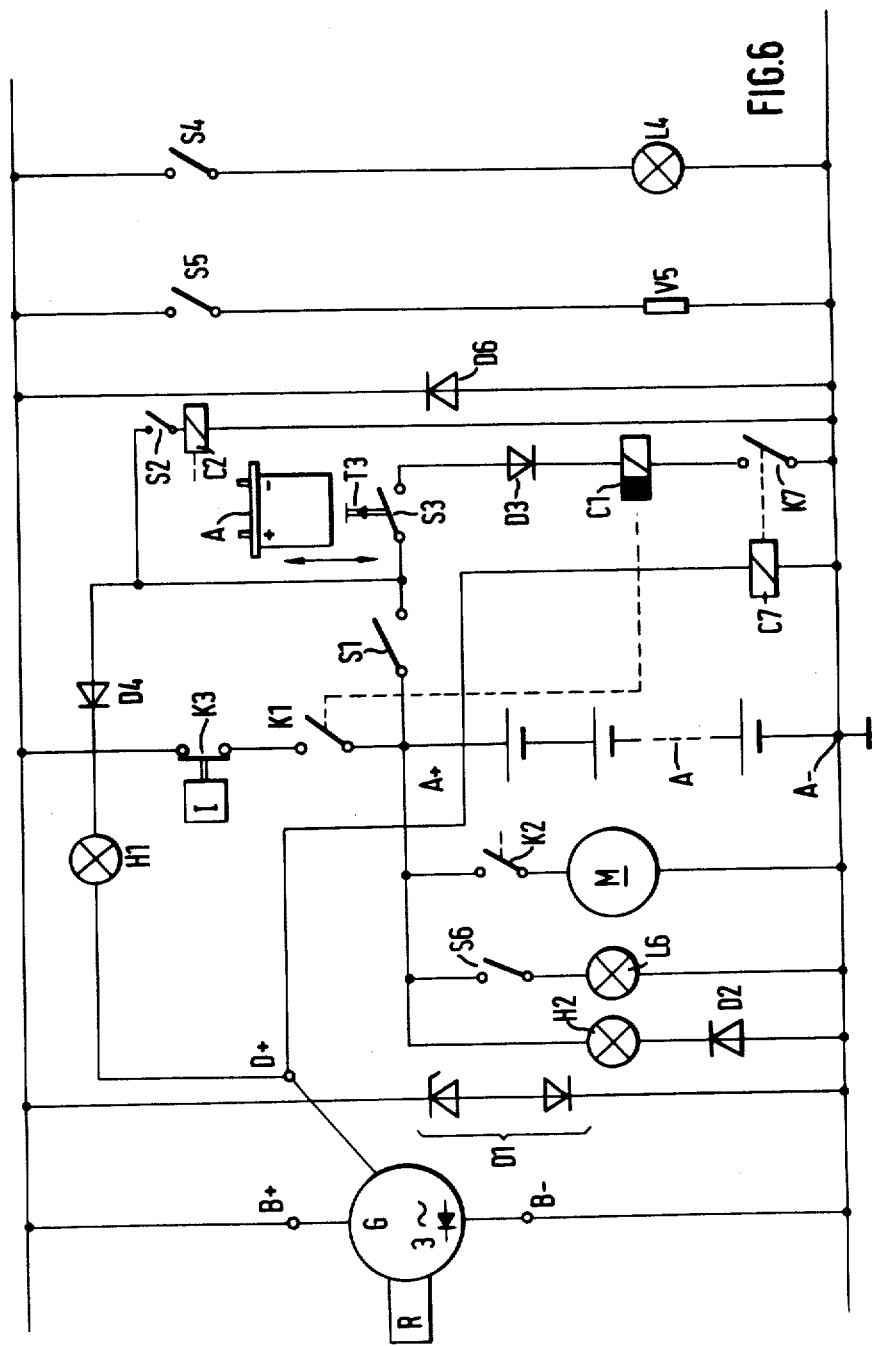
FIG. 6 is a variation of the embodiment shown in FIG. 3 including the auxiliary relay of FIG. 5.

The embodiment shown in FIG. 6 differs from that shown in FIG. 5 in that an excess current cutout is provided, relay C1 has a predetermined dropout time and, further, an indicator indicating the fact that the battery has been connected with incorrect polarity is provided. The excess current cutout I with associated contact pair K3 and relay C1 with the predetermined dropout time are connected as in the third embodiment. Shunting diode D6 is also connected as in FIG. 3. Connected in parallel with the battery terminals is a series circuit including an indicator element, for example a glow lamp, H2, and a diode D2, the anode of diode D2 being connected to terminal B—.

In this embodiment too, the engine can be started. However, if the battery is connected with wrong polarity, contacts K1 remain open. Battery A is not charged because no connection exists to the rest of the system. However, the driver of the automobile is informed by indicator lamp H2 that the polarity of the battery is incorrect. Excess current cutout I furnishes additional protection. If, while a weak battery A is connected with the correct polarity and the engine is running an external voltage source with low internal impedance, for example a strong external battery or a battery charging apparatus is connected with wrong polarity, the circuit will respond as if battery A has been connected with incorrect polarity. In this case excess current cutout I disconnects the system from the external voltage source by means of contact pair K3.

Figure 7:
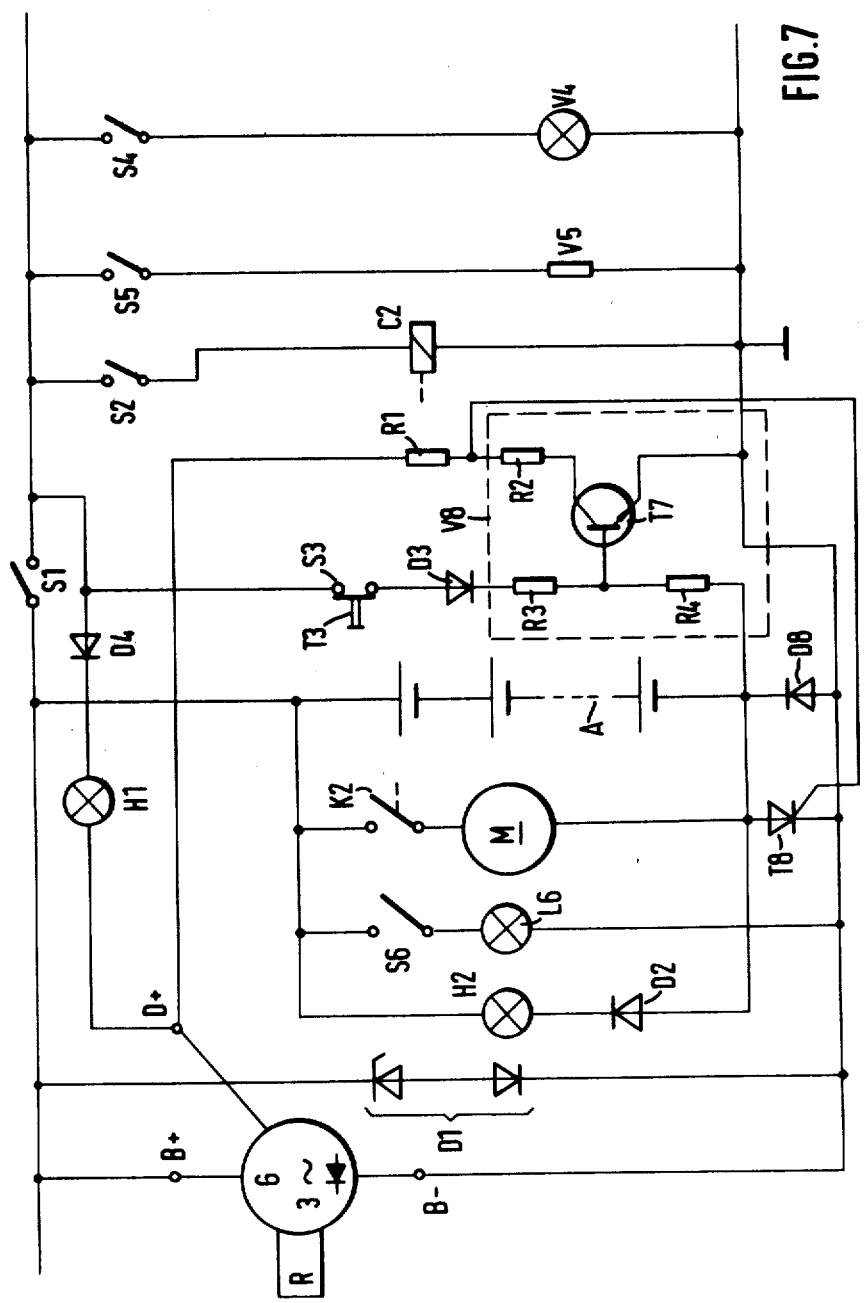
FIG. 7 illustrates a third main embodiment utilizing a thyristor switch.

An embodiment which operates with semiconductor switches is shown in FIG. 7. Terminal B— of alternator G, one terminal of relay coil C2 and one terminal of loads V4 and V5 are connected together and may be connected to the chassis of the vehicle. The negative terminal of battery A, one terminal of starter motor M and one terminal of the indicator arrangement including diode D2 and lamp H2 are connected through a diode D8 to terminal B— and/or chassis. A thyristor T8 is connected in parallel with diode D8. The anode of diode D8 and the cathode of thyristor T8 are connected to chassis and therefore to terminal B—. The gate of thyristor T8 is connected to the output of an amplifier V8. Between the output terminal of amplifier V8 and terminal D+ a resistor R1 is arranged. Amplifier V8 includes a transistor T7 with a collector resistor R2 and a base voltage divider R3, R4. The circuit of amplifier V8 is exemplary only. Other types of circuits can readily be used. Input voltage divider R3, R4 replaces winding C1 of the protective relay of the preceding embodiments.

Discharge current can flow through diode D8 when a battery A is present and is connected with the correct polarity. When a battery A is present, contacts S3 are closed by movable contact T3. When battery A is connected with a correct polarity, current flows through diode D3 and input voltage divider R3, R4 and transistor T7 is conductive. This causes thyristor T8 to switch to the conductive state and allows charging current to flow from alternator G into battery A. If the battery is connected with wrong polarity, thyristor T8 remains blocked.

Figure 8:
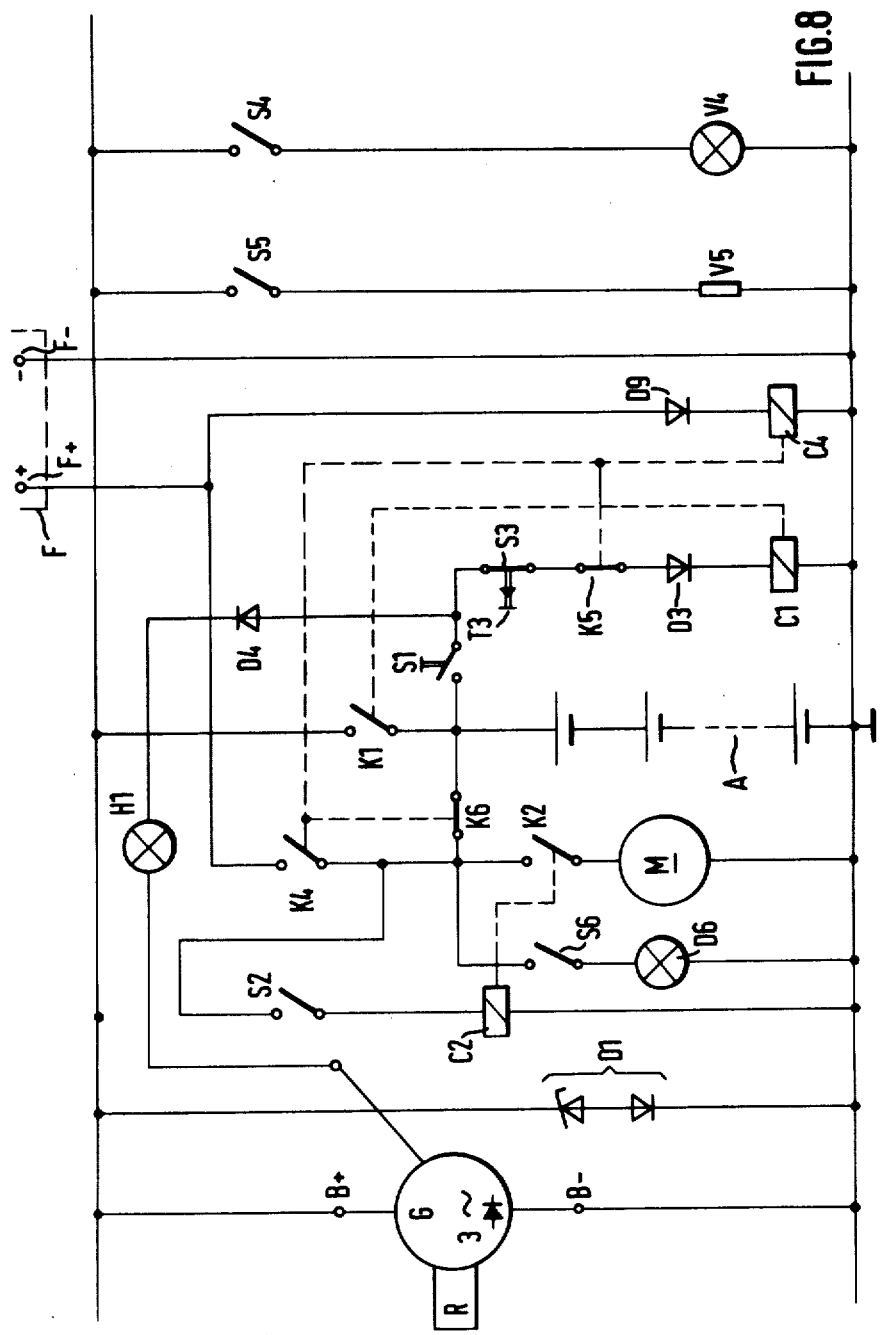
FIG. 8 illustrates an embodiment of the present invention for use with connection of an additional external voltage source.

The embodiment of FIG. 8 corresponds in the main to that shown in FIG. 1. In addition, the switch T3/S3 is present in the embodiment shown in FIG. 8, as is an additional protective relay C4 which controls contact pairs K4, K5 and K6 and whose coil is connected in series with a further protective diode D9. A socket F is provided for receiving the output of an external voltage source. The ground connection F— of the F is connected to the chassis of the vehicle, that is to terminal B—. A series circuit including the coil C4 of the further protective relay and diode D9 is connected between terminal F+ of socket F and terminal B—. Terminal F+ can be connected to starter motor M through terminals K4 following activation of starter switch S2 and, therefore, the closing of contacts K2. Contact pair K5 is connected in series with contacts S3 of switch S3/T3, diode D3 and relay coil C1. A pair of normally closed contacts K6 is provided. Contacts K6 are opened during normal operation when the auxiliary voltage source is being applied for starting the engine. This prevents connection to battery A.

The embodiment of FIG. 8 is provided for commercial vehicles which have only a weak battery A and which must be started with help of a strong auxiliary battery. Actually the relay C4 in conjunction with the contacts operated thereby have exactly the same effect as relay C1 of the first embodiment has for the vehicle battery A. The functioning of the circuit need therefore not be discussed in detail. Contacts K5 cause the protective circuit for battery A to be disconnected from the system during starting with an external voltage source. Additional contacts K6 prevents equalizing current from flowing if battery A is connected with wrong polarity. For the rest, simply connecting the external voltage source to socket F allows all protective circuits to operate.

Figure 9:
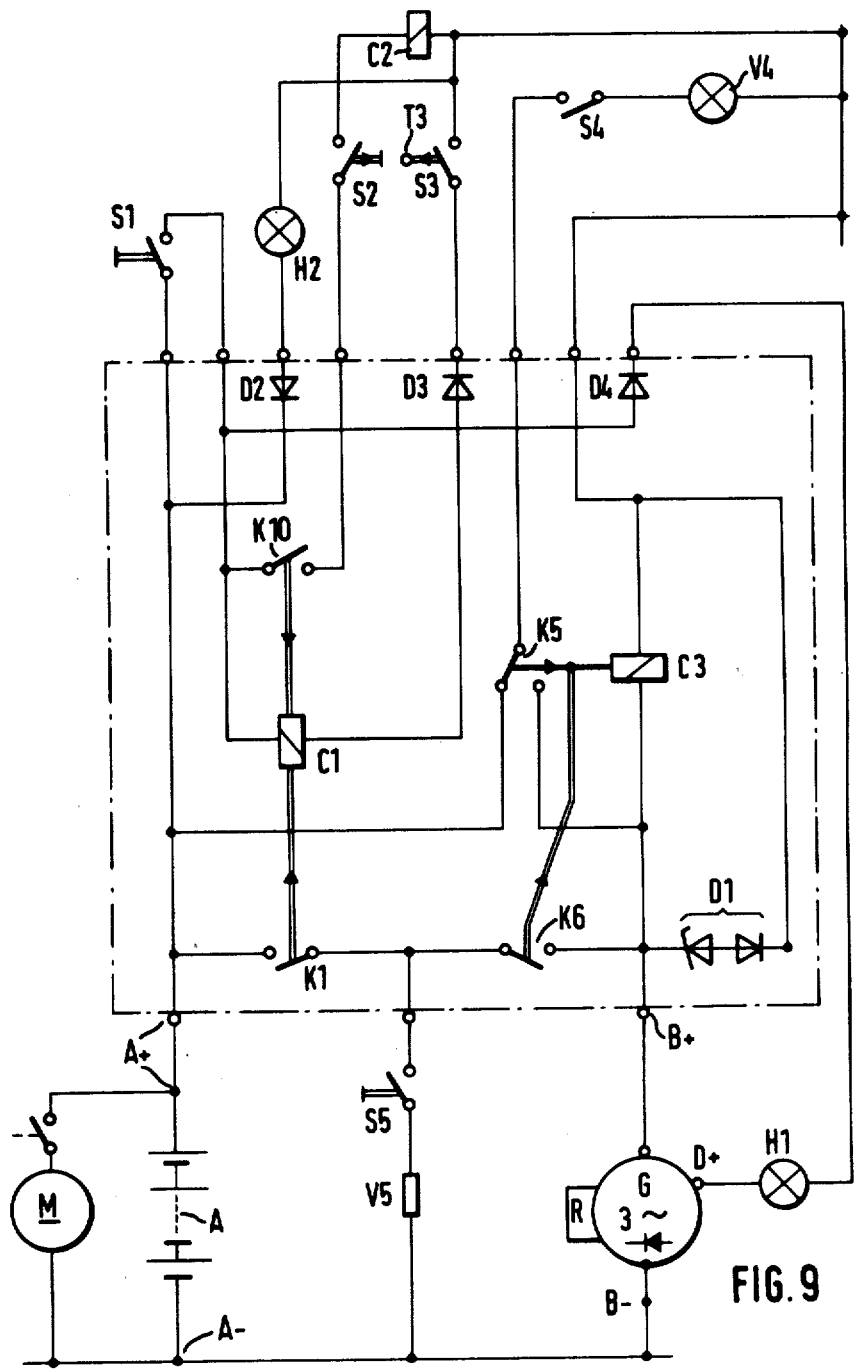
FIG. 9 shows an embodiment of the present invention wherein the starting motor can only start if the battery is present and has the correct polarity.

The embodiment shown in FIG. 9 corresponds to that shown in FIG. 5, but does not have the excess current cutout. Relay C1 controls a further pair of contacts K10 in addition to contacts K1. Contacts K10 are connected in series with starter switch S2. A further relay C3 is provided whose coil is conected across terminals B+ and B— of alternator G. Relay C3 controls selector contacts K5 which, when coil C3 is not energized, provide a connection between terminal A+ and loads L4 which are not sensitive to the polarity of the applied voltage. These loads comprise, for example, the lights of the vehicle and warning blinkers. As before, the loads may be switched on by a switch S4. If relay C3 is energized, the above-mentioned loads are switched to terminal B+ of alternator G. Simultaneously, loads V5 which do require application of a voltage of correct polarity are connected to terminal B+ through contacts K6 and closure of switch S5.

Relay C1 allows the engine to be started only when battery A is present and is connected with the correct polarity. Relay C3 can only be energized when alternator G furnishes a voltage. Only then do contact pairs K1 and K6 allow charging current to flow to battery A. When battery A is connected with the correct polarity and main switch S1 is activated, the loads V5 which are sensitive to the applied voltage are connected through contact pair K1 to terminal A+ even when the engine is not running. These loads may be switched in by activation of switch S5.

FIG. 10 is a table which summarizes the types of protection which can be obtained with the embodiments described above.

Various changes and modifications may be made within the scope of the inventive concepts.

We claim:

1. In an automotive electrical system including
  an alternator having an exciter winding, exciter diodes connected to said exciter winding, a positive exciter terminal (D+), a positive rectified alternator output terminal (B+), and a negative rectified alternator terminal (B—), connected to a reference potential, a battery (B) having a negative terminal (A−) connected to said reference potential and a positive terminal (A+);

a starter motor (M);

and starter switch means (S2, C2, K2) connected to said battery so that said motor is started upon activation of said starter switch means independent of the polarity of said battery, apparatus for protecting said system from application of a voltage having a polarity opposite the polarity of said battery comprising a control switch S1;

a protective diode (D3) conductive only when the polarity of the DC voltage is of the predetermined polarity of said battery, switch means including a relay (C1, K1) comprising a relay coil (C) connected in series with said protective diode and the control switch (S1) and a pair of relay contacts (K1) operative on the control of said relay coil and connected in series with the terminals (A+, A−) of said battery;

the relay coil being connected to said system and to said blocking diode for connection of DC voltage to, and disconnection of DC from said system when said blocking diode is, respectively, conductive or non-conductive with respect to said polarity of the battery;

and further comprising an auxiliary relay (C7, K7) having a coil connected between said positive exciter terminal (D+) and said reference potential (B−, A−), and a pair of auxiliary relay contacts (K7) connected in series with the relay coil (C1) of said first relay (C1, K1).

2. A system as set forth in claim 1, wherein said diode is a shunting diode in said conducting state only when said polarity of said DC voltage is said opposite polarity; and wherein said switch means includes an excess current cutout (K3).

3. A system as set forth in claim 2, wherein said excess current cutout is connected in series with said terminals; and wherein said shunting diode is connected in parallel with the series circuit comprising said terminals and said excess current cutout.

4. A system as set forth in claim 3, wherein said system comprises a first load (L6) directly connected from said first to said second terminal, and a second load (L4) connected in parallel with said shunting diode.

5. A system as set forth in claim 1, wherein said system comprises a first load (L6) directly connected to said first and second terminals, and a second load (L4) connected in parallel with the series circuit formed by said terminals and said pair of relay contacts.

6. A system as set forth in claim 1, further comprising means (T3, S3) for interrupting the current through said first relay coil upon removal of said battery.

7. A system as set forth in claim 6, wherein said means for interrupting said current through said first relay coil comprises a pair of contacts connected in series with said relay coil and a contact arm bridging said pair of contacts only in the presence of said battery.

8. A system as set forth in claim 1, further comprising a series circuit comprising a Zener diode with reverse polarity and a series diode with forward polarity connected in parallel with said alternator output terminals.

9. A system as set forth in claim 5, further comprising a shunting diode (D6) and an excess current cutout (K3) operative in response to current flow through said shunting diode for preventing application of said DC voltage to said system.

10. A system as set forth in claim 9, wherein said excess current cutout is connected in series with said contact pair of said first relay;

wherein said DC voltage is supplied by the battery, and a series circuit is formed by said battery, said pair of first relay contacts and said excess current cutout; and wherein said shunting diode is connected in parallel with the so-formed series circuit;

wherein said first load is connected directly in parallel with said battery; and wherein said second load is connected in parallel with said so-formed series circuit.

11. A system as set forth in claim 9, wherein said relay has a predetermined dropout time exceeding zero.

12. A system as set forth in claim 1, further comprising means (H2, D2) for furnishing a visual indication when said DC voltage has said opposite polarity.

* * * * *